United States Patent [19]
Moore

[11] Patent Number: 5,872,632
[45] Date of Patent: Feb. 16, 1999

[54] CLUSTER TOOL LAYER THICKNESS MEASUREMENT APPARATUS

[75] Inventor: Gary M. Moore, Monte Sereno, Calif.

[73] Assignee: Moore Epitaxial, Inc., San Jose, Calif.

[21] Appl. No.: 594,621

[22] Filed: Feb. 2, 1996

[51] Int. Cl.$^6$ .................................................. G01B 11/06
[52] U.S. Cl. ............................................................... 356/381
[58] Field of Search ..................................... 356/381, 382, 356/355, 357, 371, 369; 250/341.1, 559.27; 156/626.1; 438/908, 16; 219/121.6; 118/712–713

[56] References Cited

U.S. PATENT DOCUMENTS

| | | | |
|---|---|---|---|
| 5,293,216 | 3/1994 | Moslehi | 356/371 |
| 5,296,405 | 3/1994 | Yamazaki et al. | 437/174 |
| 5,386,119 | 1/1995 | Ledger | 356/355 X |
| 5,410,162 | 4/1995 | Tigelaar et al. | |

Primary Examiner—K. Hantis
Attorney, Agent, or Firm—Forrest Gunnison

[57] ABSTRACT

A cluster tool layer thickness measurement apparatus is part of a reactor cluster that includes a plurality of substrate processing reactors arranged around a sealed chamber in which a robot is located. The cluster tool layer thickness measurement apparatus is also mounted on the sealed chamber. After a layer is deposited on a substrate in one of the reactors, the robot removes the substrate from the reaction chamber of the reactor and places the substrate directly in the cluster tool layer thickness measurement apparatus on a substrate support. A carriage assembly moves the substrate support and consequently the substrate under an optical thickness measurement assembly. Optical thickness measurement assembly generates a signal representative of the thickness of the layer at one point that is transmitted to a monitor computer. After the measurement is completed, the carriage assembly moves the substrate so that the thickness of a layer on the substrate is measured at each of a plurality of locations.

11 Claims, 5 Drawing Sheets

CLUSTER TOOL LAYER THICKNESS MEASUREMENT APPARATUS

BACKGROUND OF THE INVENTION

1. Field of the Invention

This invention related generally to determining the quality of layers deposited on a substrate and in particular to measuring the thickness of a layer deposited on a substrate.

2. Description of Related Art

Use of automated techniques to process substrates, such as semiconductor wafers, is known in the art. Typically, a group of reactors, such as rapid thermal process reactors, are assembled in a cluster to perform a sequential set of steps in a substrate process flow. FIG. 1 is a top view of a cluster of three reactors 110, 120, and 130. Each reactor is used to perform a particular substrate process (e.g., deposition, annealing, etc.).

Reactors 110, 120, and 130 are arranged around sealed chamber 105 in which robot 104 is located. A plurality of substrate cassettes 102A, 102B, and 102C, each containing a plurality of substrates stacked on top of each other, is located in cassette room 103 adjacent clean room 101.

Substrate cassettes 102A, 102B, and 102C are first transferred from clean room 101 to cassette room 103. A computer control system directs robot 104 to take an appropriate wafer from a wafer cassette, e.g., wafer cassette 102A, from cassette room 103 and load it into an appropriate reaction chamber of a reactor, e.g., reactor 130.

Robot 104 also transfers wafers from the reaction chamber of one reactor 130 to the reaction chamber of another reactor 120. Consequently, the substrate process flow is quickly performed using robot 104 and a group of reactors, e.g., reactors 110, 120, and 130.

One problem encountered in a substrate process flow such as that illustrated in FIG. 1 is verifying that a layer deposited on the substrate is of acceptable quality. Presently, to determine the thickness of a layer deposited on the substrate, a variety of optical techniques are used.

Unfortunately, each of these techniques requires that a substrate be removed from the reactor and placed back in a cassette. The wafer is then removed from the cassette and taken to a machine, that measures the film thickness, in the clean room. This makes measuring the thickness cumbersome and relies upon the assumption that the thickness measured for a particular substrate is indicative of the thickness for a batch of substrates.

Typically, the optical techniques used include infrared reflectance measurement methods, interferometric methods, and ellipsometry. While these optical techniques are useful, each presently requires a measurement apparatus removed from the reactor cluster which in turn limits the throughput of the reactor cluster and complicates thickness measurements.

SUMMARY OF THE INVENTION

According to the principles of this invention, a cluster tool layer thickness measurement apparatus is located in a reactor cluster. Thus, according to the principles of this invention, after a layer is deposited on a substrate in a reactor in the cluster, the substrate is removed from the reaction chamber of the reactor and placed in the cluster tool layer thickness measurement apparatus, which in turn measures the thickness of the deposited layer.

The ability to measure the thickness of a layer without removing the substrate from the reactor cluster has several advantages. First, the time required to remove the substrate and take the substrate to a remote instrument is eliminated. Second, the location of the layer thickness measurement cluster tool facilitates monitoring of thickness variations from batch to batch. Third, the possibility of introducing contamination in the thickness measurement process is reduced.

In one embodiment, a carriage assembly in the cluster tool layer thickness measurement apparatus includes a substrate support. The carriage assembly moves the substrate support and a substrate placed thereon under an optical thickness measurement assembly. The optical thickness measurement assembly is activated, and a signal representative of the thickness of the layer is transmitted to a monitor computer. In one embodiment, the carriage assembly moves the substrate so that the thickness of a layer on the substrate is measured at each of a plurality of locations. Typically, for a circular substrate, the thickness is measured either along a radius or diameter of the substrate, the substrate is rotated a selected distance and the measurements are repeated along another radius or diameter of the substrate. The thickness measurement can be used to control process parameters for the reactors within the cluster.

DETAILED DESCRIPTION

Figure 1:
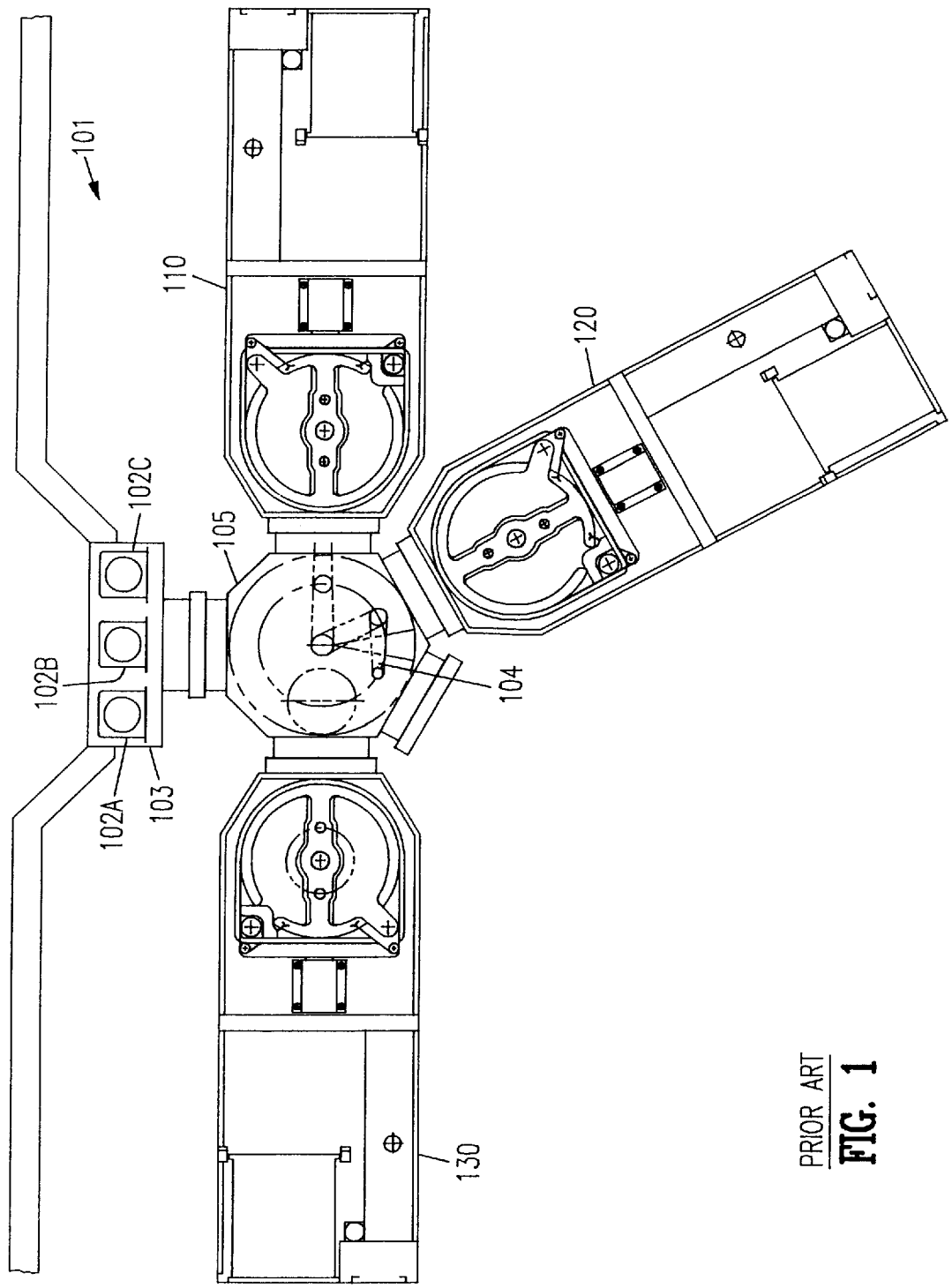
FIG. 1 is an illustration of a prior are reactor cluster.
Figure 2:
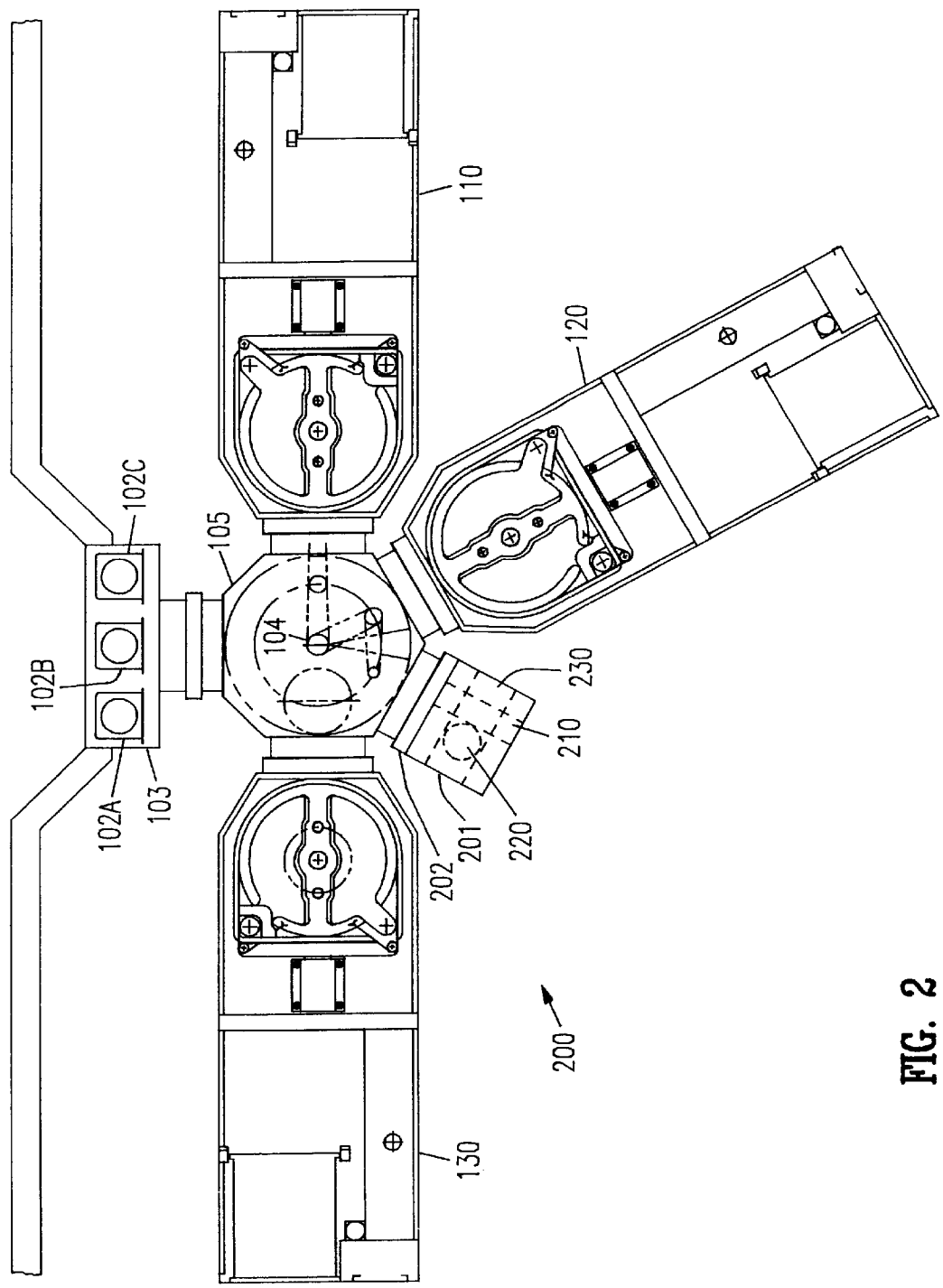
FIG. 2 is an illustration of a reactor cluster that includes the cluster tool layer thickness measurement apparatus of this invention.

According to the principles of this invention, a cluster tool thickness measurement apparatus is located as a part of a reactor cluster 200. In this embodiment, reactors 110, 120, and 130 are arranged around sealed chamber 105 in which robot 104 is located as in the prior art. However, cluster tool layer thickness measurement apparatus 201 is also mounted on sealed chamber 105.

One embodiment of reactors 110, 120, and 130, sealed chamber 105 and robot 104 suitable for use with this invention is described in commonly assigned U.S. Patent Applications, each of which is hereby incorporated in its entirety:

1. U.S. patent application Ser. No. 08/007,981 entitled "RAPID THERMAL PROCESSING APPARATUS FOR PROCESSING SEMICONDUCTOR WAFERS" of Gary M. Moore and Katsuhito filed Jan. 21, 1993, now U.S. Pat. No. 5,444,217, issued Aug. 22, 1995; and 2. U.S. patent application Ser. No. 08/185,691 now U.S. Pat. No. 5,683,518, entitled "A RAPID THERMAL PROCESSING APPARATUS FOR PROCESSING SEMICON- DUCTOR WAFERS" of Gary M. Moore and Katsuhito Nishikawa, filed Jan. 21, 1994.

Thus, according to the principles of this invention, after a layer is deposited on a substrate in reactor 120, for example, robot 104 removes the substrate from the reaction chamber of reactor 120 and places the substrate on a substrate support 220 in cluster tool layer thickness measurement apparatus 201.

As explained more completely below, a carriage assembly 210, that includes substrate support 220, moves the substrate under an optical thickness measurement assembly 230. Optical thickness measurement assembly 230 is activated, and a signal representative of the thickness of the layer at one point is transmitted to a monitor computer (not shown).

In one embodiment, carriage assembly 220 moves the substrate so that the thickness of a layer on the substrate is measured at each of a plurality of locations. Typically, for a circular substrate, the thickness is measured either along a radius or diameter of the substrate, the substrate is rotated a selected distance, and the measurements are repeated along another radius or diameter of the substrate.

The ability to measure the thickness of a layer without removing the substrate from cluster 200 has several advantages. First, the time required to remove the substrate and take the substrate to a remote instrument is eliminated. Second, the location of cluster tool layer thickness measurement apparatus 201 facilitates monitoring of thickness variations from batch to batch. Third, the possibility of introducing contamination in the thickness measurement process is reduced. Also, the data can be used to adjust process parameters for any one or all of reactors 110, 120 and 130, and can be used to automatically adjust or stop the operation of apparatus 201.

Figure 3:
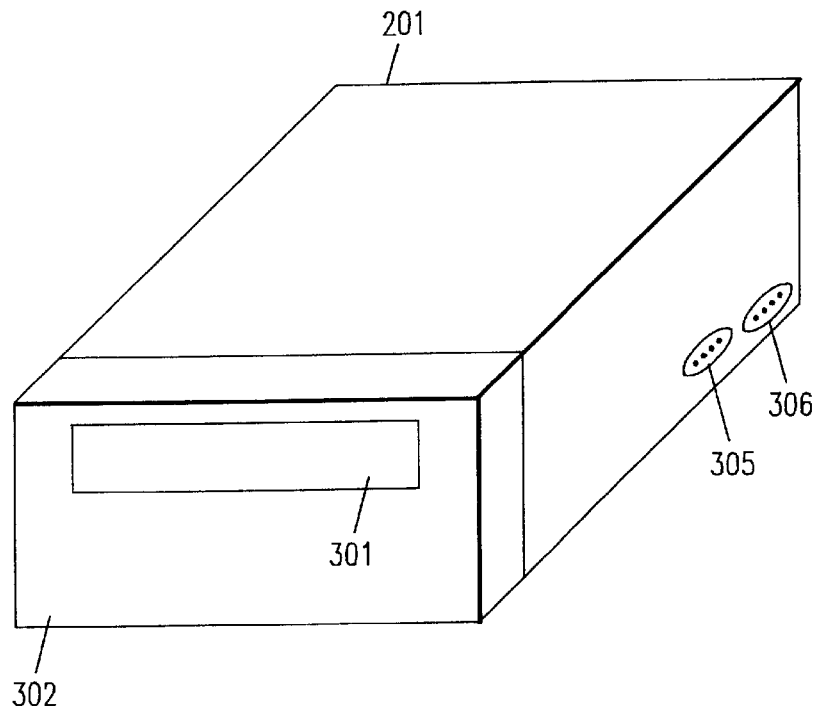
FIG. 3 is a perspective view of the cluster tool layer thickness measurement apparatus of this invention.

FIG. 3 is a perspective view of one embodiment of the cluster tool apparatus of this invention. A gate valve 301, similar to the gate values used on reactors 110, 120, 130, is mounted on a side 302 of cluster tool layer thickness measurement apparatus 201 that connects to sealed chamber 105. Gate valve 301 is normally closed and is opened when robot 104 is ready to place a substrate in cluster tool layer thickness measurement apparatus 201. Cluster tool layer thickness measurement apparatus 201 has an RS 232 serial port 305, that is used as a diagnostic programmer interface port, and a semiconductor equipment communication standard (SECS) port 306. Cluster tool layer thickness measurement apparatus 201, in one embodiment, is light tight with gate value 301 closed, and vacuum capable. However, it is not necessary for apparatus 201 to be light tight.

Figure 4:
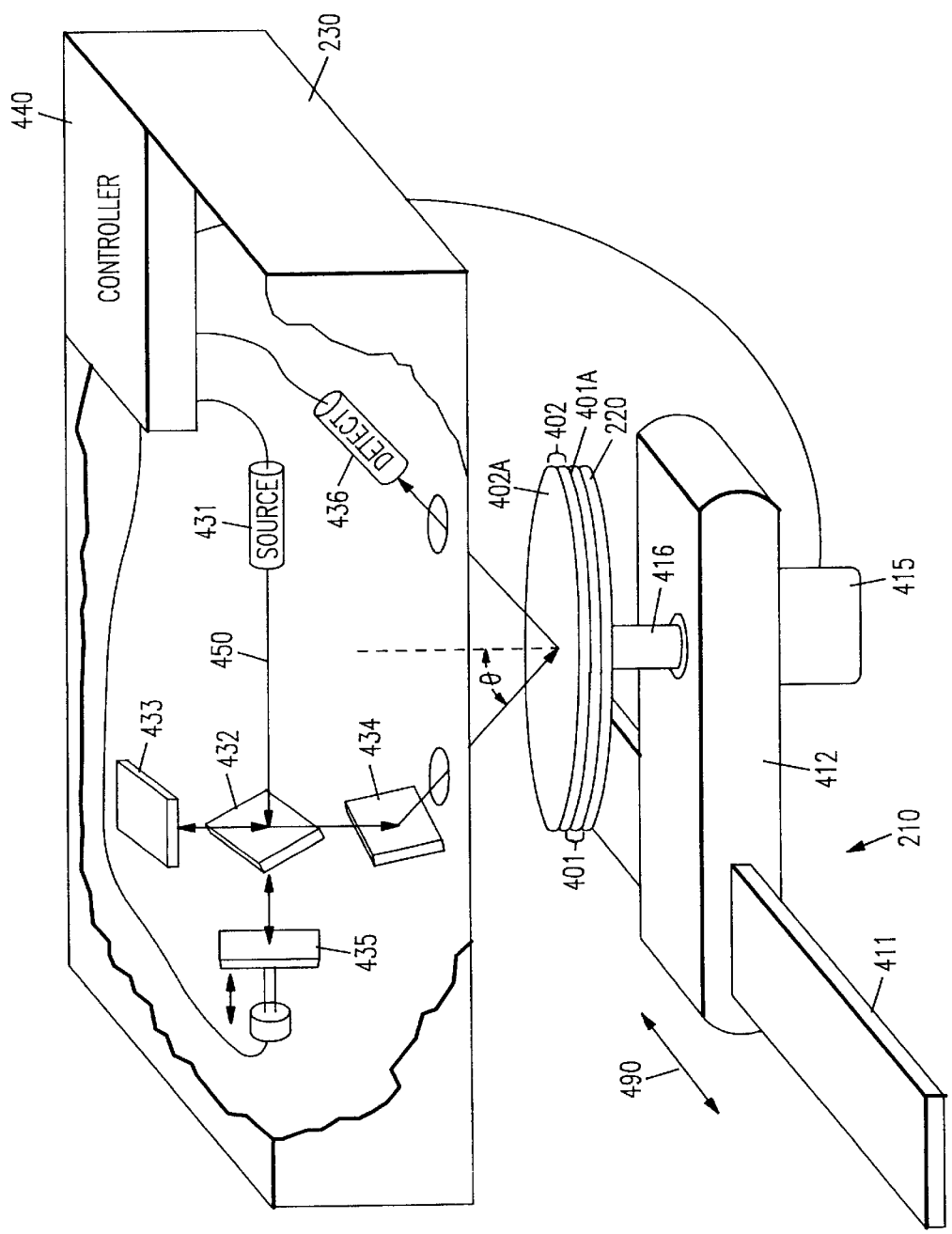
FIG. 4 is a perspective view of the carriage assembly, substrate support, and optical thickness measurement assembly with a Michaelson interferometer in the cluster tool layer thickness measurement apparatus of this invention.

FIG. 4 illustrates one embodiment of the components within cluster tool layer thickness measurement apparatus 201. Carriage assembly 210 includes a rail 411 that in turn houses a lead screw connected to a stepper motor (not shown). A linear translation assembly 412 is movably mounted about rail 411 (i) to maintain substrate support 220 stable in a plane substantially parallel to a lower surface 431 of optical thickness measurement assembly 230; and (2) to translate substrate support 220 in a linear direction 490 towards and away from gate valve 301.

In this embodiment, linear translation assembly 412 is movably affixed to the lead screw with a pitch in the range of 100 to 500 thousandths of an inch per revolution and in one embodiment 200 thousandths of an inch per revolution. As the stepper motor turns the lead screw, linear translation assembly 412 is moved along rail 411. Consequently, controller 440 moves linear translation assembly 412 back and forth along rail 411 by controlling the direction of rotation of the stepper motor, and the number of revolutions of the stepper motor. In one embodiment, stepper motor has 200 steps per revolution or at least a 1.8° accuracy.

The particular method used to affix linear translation assembly 412 to the lead screw is not critical. Alternatively, a cable assembly could be used in conjunction with the stepper motor, instead of the lead screw, to move linear translation assembly 412. Substrate support 220 is rotatably mounted on linear translation assembly 412 and connected to a pancake stepper motor 415 by a shaft 416. Substrate support 220, and consequently, a substrate 401 placed thereon, is rotated by pancake stepper motor 415. In one embodiment, pancake stepper motor 415 has 10,000 to 20,000 steps per revolution.

Substrate support 220, in one embodiment, is a silicon carbide coated metal support. One important aspect is that substrate support 220 has a large thermal mass relative to substrate 401 so that substrate support 220 uniformly conducts heat away from substrate 401. This assists in cooling substrate 401 prior to the measurement of the layer thickness. Also, at least the surface of substrate support 220 in contact with the backside of substrate 401 is preferably made from a material that does not contaminate substrate 401.

Another important aspect is that substrate support 220 holds substrate 401 in a fixed position relative to substrate support 220. Maintaining substrate 401 stationary relative to substrate support 220 is necessary to assure that the thickness measurements made at various points on the substrate have the proper relative spacing. In one embodiment, friction between the material making up a top surface of substrate support 220 and a bottom surface of substrate 401 is used to maintain substrate 401 in a fixed position. In another embodiment, a series of openings are provided in the top surface of substrate support 220 and a vacuum is drawn on the series of openings to hold substrate 401 in place.

Initially, controller 440 powers carriage assembly 210 so that substrate support 220 is adjacent gate valve 301. After controller 440 opens gate valve 301, robot 104 places substrate 401 on substrate support 220. Gate valve 301 is closed by controller 440 and controller 440 provides signals to carriage assembly 210 to move linear translation assembly 412 in a first direction away from gate valve 301 until substrate support 220 is positioned at a first position under optical thickness measurement assembly 230. An optical limit switch in conjunction with a flag on linear translation assembly 412 is used to determine the first position.

In FIG. 4, a preferred embodiment of optical thickness measurement assembly 230 includes a Michaelson interferometer with light source 431, beam splitter 432, fixed mirrors 433 and 434, moving mirror 435 and detector 436 and utilizes a Fourier transform reflective method to measure layer thickness. When substrate 401 is in the first position, a light source 431 is activated by controller 440.

Typically, light source 431 provides a collimated beam of light 450. Beam splitter 431 reflects about half of collimated beam of light 450 to fixed mirror 433, and about half of collimated light beam 450 is passed through beam splitter 431 to movable mirror 435.

After reflection, the two beams from each arm recombine at beam splitter 432 and either constructively or destructively interfere depending on the difference in path lengths from beam splitter 432 to the respective mirrors. The recombined light bean is reflected by fixed mirror 434 so that the recombined light beam has an angle of incidence 0 with substrate 401 and layer 402.

The recombined light beam is reflected by substrate 401 and layer 402 to a detector 436. Thus, the light measured by detector 436 is that reflected by surface 402A of layer 402 and that reflected at interface 401A of layer 402 and substrate 401. The amplitude and phase of the two beams is a function of the position of moving mirror 435.

When mirrors 433 and 435 are equidistant from beam splitter 432, detector 436 generates a large output signal in the Fourier transform domain since the reflected beams from both mirrors are in phase. As the position of moving mirror 435 is changed, the two reflected beams destructively interfere and detector output signal 436 is approximately zero in the Fourier transform domain.

However, when moving mirror 435 is displaced by a distance proportional to the additional path length of the light through layer 402 to interface 401A, constructive interference occurs and another peak is measured, that is called first-order reflection or sideburst. In this case, layer thickness T is $$T = X/(2 \cdot ni \cdot \cos\theta)$$

where x is the displacement of movable mirror 435 for which the first order phase coincidence is the strongest, and ni is the index of refraction of layer 402. This assumes that the phase shift for reflection at surface 402A is the same as the phase shift at interface 401A. Typically, this is not true, but this affects the shape of the first-order reflection peak, and not the location of the peak in the Fourier transform domain.

In one embodiment, a helium-neon laser is used as a clock for the sampling rate and so the displacement of moving mirror is precisely measured. An absolute thickness is determined by measuring standard refractive index systems and correlating these measurements with layer thickness T. The methods and operations for FTIR are well-known to those of skill in the art and so are not described in further detail herein. One optical spectrometer suitable for use as optional thickness measurement assembly 230 is a general purpose FTIR spectrometer with at least a one $cm^{-1}$ resolution with a 7800 to 350 $cm^{-1}$ range and a high energy 1650° K. Sic source. One spectrometer suitable for use in this invention is the Prospect●IR General Purpose Spectrometer available from Midac Corporation, 17911 Fifth Avenue, Irvine, Calif. 92714.

Figure 5:
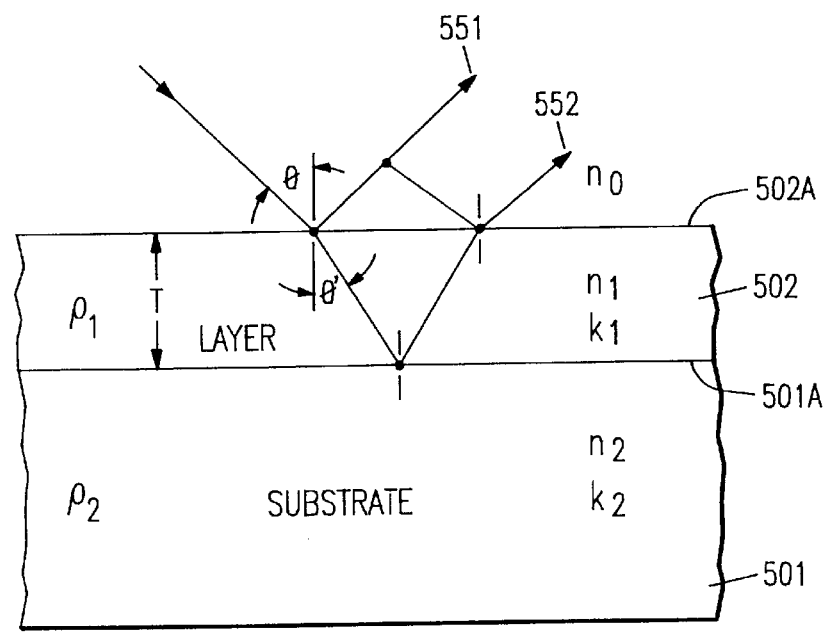
FIG. 5 is a diagram that illustrates the parameters used to analyze the thickness of a layer with an optical thickness measurement assembly of this invention using a dispersive infrared spectrophotometer.

In another embodiment, optical thickness measurement assembly 230 measures the reflectance of substrate 401 and layer 402 is measured as a function of wavelength using a dispersive infrared spectrophotometer. Typically, this embodiment is used to measure an epitaxial layer 502 (FIG. 5) having a thickness greater than 2 µm. Epitaxial layer 502 is deposited on a substrate 501 having the same type conductivity as epitaxial layer 502 and the resistivity ρ2 of substrate 501 is less than 0.02 ohm cm and resistivity ρ1 of epitaxial layer 502 is greater than 0.1 ohm cm.

In this embodiment, the measured spectrum has successive minimum and maximum that result from interference of light 551 reflected from surface 502A and of light 552 reflected interface 501A. The procedure for determining layer thickness T is described in ASTM F-95. Briefly, thickness T is determined from:

$$T = \{[(P - 1/2) + (\phi/2\pi)] \cdot \lambda\}/\{2 \cdot [n1^{}2 - \sin^{}2(\theta)]^{**}0.5\}$$

where
T=epitaxial layer thickness;
p=orders of the interference fringe;
Φ=phase shift at interface 501A;
n1=index of refraction of epitaxial layer;
n2=index of refraction of substrate;
n0=index of refraction of air;
k1=dielectric constant of epitaxial layer;
k2=dielectric constant of substrate;
θ=angle of incidence of infrared beam;
λ=wavelength of interference fringe.

Figure 6:
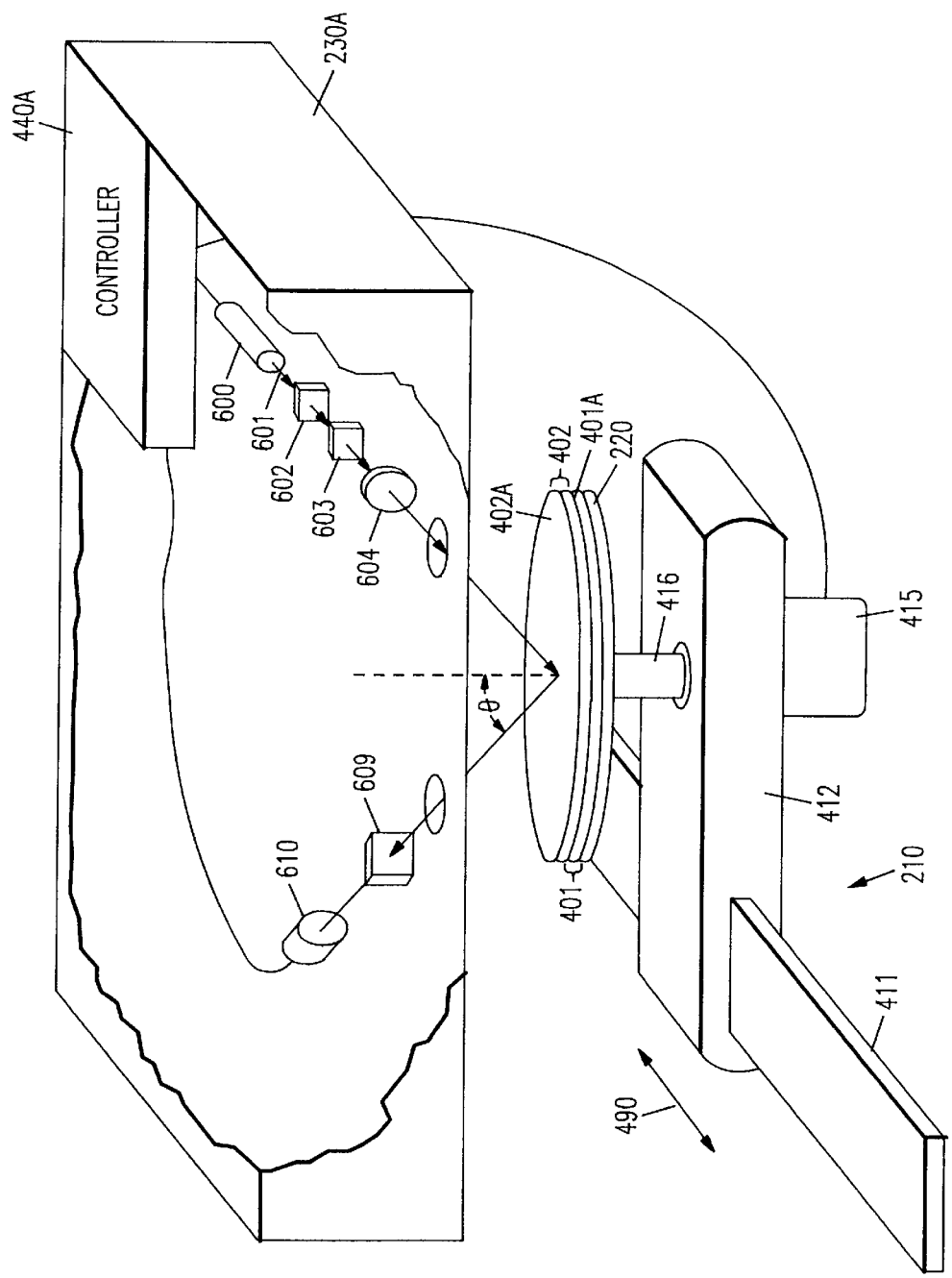
FIG. 6 is a perspective view of the carriage assembly, substrate support, and optical thickness measurement assembly with an ellipsometer in the cluster tool layer thickness measurement apparatus of this invention.

In another embodiment, optical thickness measurement assembly 230A (FIG. 6) includes an ellipsometer in place of the Michaelson interferometer of FIG. 4. Typically, the ellipsometer is used to measure film thickness in the range of angstroms. In this embodiment, a beam 601 from a laser 600 is passed through a depolarizer 601. The depolarized beam from depolarizer 601 is passed through a polarizer 602 so that the polarized beam has a known orientation.

The polarized beam is passed through a rotating birefringent plate 609 and the resulting beam of modulated light has an angle of incidence θ with respect to surface 402A of layer 402. The reflected light from the two surfaces, i.e. surface 402A and interface 401A is passed through an analyzer 609 to a photodetector 610, which in one embodiment is a PIN photodetector. The output signal from photodetector is analyzed in a conventional fashion to obtain the thickness of the film layer.

Independent of the particular optical measurement technique employed in optical thickness measurement assembly 230, support 220 is moved in a linear direction and stopped at each of a predetermined number of points. At each point, optical thickness measurement assembly 230 measures the thickness of layer 402. After this set of measurements is complete, support 220 is rotated a predetermined amount, and the measurement at each point in the linear direction repeated. Thus, cluster tool layer thickness measurement apparatus 201 of this invention permits measurement of the thickness of a number of different points on a substrate 401 without removing substrate 401 from reactor cluster 200. Cluster tool layer thickness measurement apparatus 201 overcomes the prior art problems associated with measuring layer thickness on a machine remote from reactor cluster 200.

After the thickness measurements for substrate 401 are complete, controller 440 moves carriage assembly 210 so that substrate support 220 is adjacent to gate valve 301. Controller 440 opens gate valve 301 and robot 104 removes substrate 401 from cluster tool layer thickness measurement apparatus 201 and places substrate 401 at the next location for processing. If desired, robot 104 can then place another substrate within apparatus 201.

Various alternative embodiments of cluster tool layer thickness measurement apparatus 201 have been described. Those skilled in the art will appreciate that the cluster tool layer thickness measurement apparatus 201 can be used to measure the thickness of a variety of different types of layers. Independent of the type of layer, cluster tool layer thickness measurement apparatus 201 eliminates the problems associated with using a machine remote from the reactor cluster for thickness measurements and consequently enhances throughput.

I claim:

1. A structure comprising:
   at least one substrate processing reactor;
   a sealed chamber having a plurality of ports wherein said at least one substrate processing reactor is connected to one port in said plurality of ports; and
   a cluster tool layer thickness measurement apparatus connected to another port in said plurality of ports wherein said cluster tool layer thickness measurement apparatus is used only for measurements of layer thickness properties of a substrate processed in said at least one substrate processing reactor.

2. A structure as in claim 1 wherein said cluster tool layer thickness measurement apparatus further comprises:

a carriage assembly, mounted within said cluster tool layer thickness measurement apparatus, including a substrate support wherein said carriage assembly translates said substrate support in a first direction.

3. A structure as in claim 2 wherein said cluster tool layer thickness measurement apparatus further comprises:

an optical measurement assembly, mounted within said cluster tool layer thickness measurement apparatus, wherein said optical measurement assembly includes components for measuring said thickness of said layer disposed on said substrate.

4. A structure as in claim 3 wherein said optical measurement assembly includes a Michaelson interferometer.

5. A structure as in claim 1 wherein said cluster tool layer thickness measurement apparatus further comprises:

a gate valve coupled to said another port in said plurality of ports.

6. A structure as in claim 2 wherein said support comprises a silicon carbide coated metal support.

7. A structure as in claim 2 further comprising a stepper motor coupled to said support wherein said stepper motor rotates said support.

8. A structure comprising:

at least one substrate processing reactor;

a sealed chamber having a plurality of ports wherein said at least one substrate processing reactor is connected to one port in said plurality of ports; and a cluster tool layer thickness measurement apparatus connected to another port in said plurality of ports comprising:

a gate valve coupled to said another port in said plurality of ports;

a carriage assembly, mounted within said cluster tool layer thickness measurement apparatus, including a substrate support wherein said carriage assembly translates said substrate support in a direction towards and away from said gate valve: and an optical measurement assembly, mounted within said cluster tool layer thickness measurement apparatus, wherein said optical measurement assembly includes components for measuring a thickness of a layer disposed on a substrate and further wherein said cluster tool layer thickness measurement apparatus is used only for substrate layer thickness measurements.

9. A structure as in claim 8 wherein said support comprises a silicon carbide coated metal support.

10. A structure as in claim 8 further comprising a stepper motor coupled to said support wherein said stepper motor rotates said support.

11. A method for measuring a thickness of a layer deposited on a substrate within a reactor cluster comprising:

depositing a layer on a substrate in a substrate processing reactor coupled to a sealed chamber containing a robot wherein said substrate processing reactor and said sealed chamber are included in said reactor cluster;

removing said substrate from said reactor using said robot;

placing said substrate in a cluster tool layer thickness measurement apparatus coupled to said sealed chamber by said robot; and measuring a thickness of said layer on said substrate in said cluster tool layer measurement apparatus, wherein said cluster tool layer measurement apparatus is included in said reactor cluster, and said cluster tool layer measurement apparatus is used only for said substrate layer thickness measurements.

* * * * *